Dec. 2, 1958     B. C. SKINNER     2,862,485
VALVE OPERATING LINKAGE AND METHOD
OF ADJUSTING AND CONTROLLING SAME

Filed March 26, 1956     3 Sheets-Sheet 1

Dec. 2, 1958 B. C. SKINNER 2,862,485
VALVE OPERATING LINKAGE AND METHOD
OF ADJUSTING AND CONTROLLING SAME
Filed March 26, 1956 3 Sheets-Sheet 2
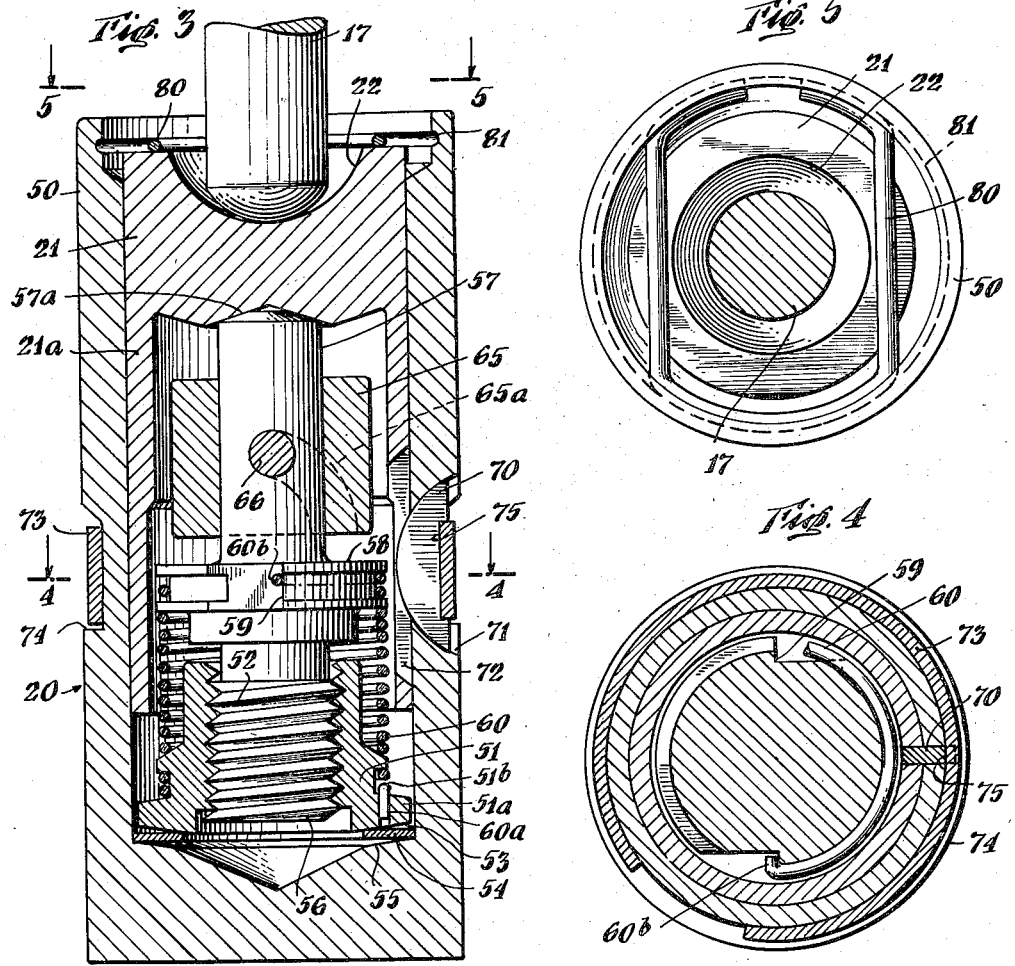
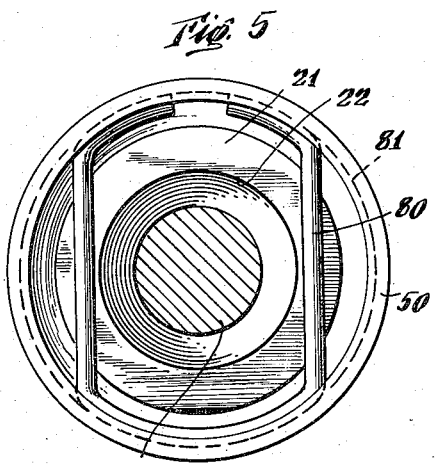
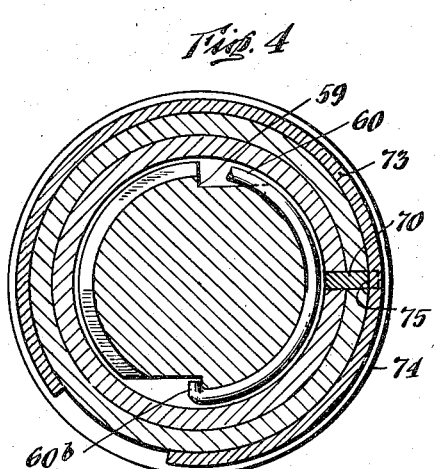
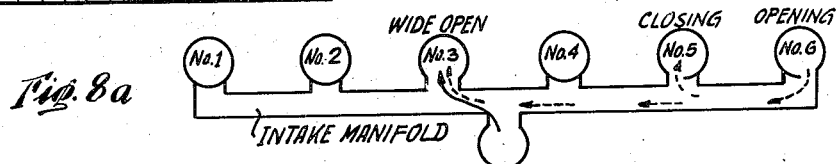
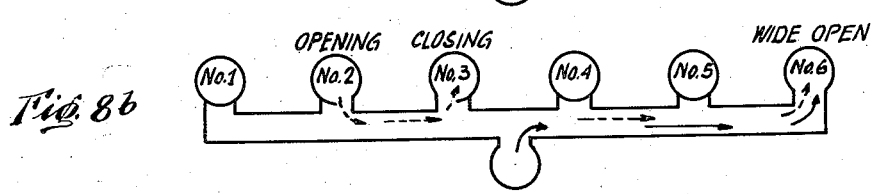
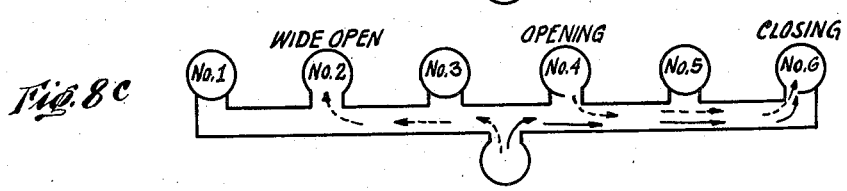

United States Patent Office 2,862,485
Patented Dec. 2, 1958

2,862,485

VALVE OPERATING LINKAGE AND METHOD OF ADJUSTING AND CONTROLLING SAME

Bronson C. Skinner, Dunedin, Fla., assignor to Brunhilde W. Skinner, Dunedin, Fla.

Application March 26, 1956, Serial No. 573,938

9 Claims. (Cl. 123—90)

The invention is concerned with valve operating linkage means for poppet valves in internal combustion engines or similar types of engines in which the valve is normally urged to its seat by a strong spring and opening and closing of the valve, and the time intervals, are controlled by a rotary cam adapted to exert axial thrust on the reciprocable linkage members. The invention in particular concerns automatic length adjusting or compensating devices or tappets as embodied in such linkage means, and methods of adjusting and controlling the effects of the linkage means.

Such a length adjusting means is required to cope with many operating conditions including variations resulting from engine operation at different speeds and loads and at different temperatures. In particular the different temperatures cause expansion and contraction of the valve stems and other linkage elements which vary the timing relations. Proper timing of the valve operation is of course a primary requisite. Also rapid opening and closing of valves is desirable to prevent "wire-drawing" but too rapid movement, particularly at the moment of valve seating, causes noisy operation. The present invention is directed to an improved form of length adjusting means including a method of installing it and adjusting the linkage effect such as to meet successfully the various operating conditions, many of which are conflicting in their requirements.

The principles of the invention may be embodied in arrangements employing different types of automatic length adjusting tappets either of the generally hydraulic or mechanical type. In the particular form specifically illustrated and described herein the tappet is of the mechanical type. The general features of a known construction in automatic mechanical tappets such as are incorporated in the present embodiment of the invention include complemental screw members relatively rotatable in one direction by an inertia means intermittently effective in accordance with the rapid axial reciprocatory motion to shorten the overall length of the effective link, and constantly urged in the opposite relative rotary direction by a torsion spring, effective between hammer blows of the inertia means and during the intervals that the linkage is free of axial pressure from the main valve spring, to elongate the linkage and take up any slack.

The invention accordingly comprises an apparatus and a method of installing and adjusting it possessing the features, relation of elements and operating characteristics which will be exemplified in the forms of apparatus hereinafter described.

Reference should be had to the drawings in connection with the description, in which:

Fig. 3 is a vertical section on an enlarged scale through one of the link adjusting devices such as that of Fig. 1;

Fig. 4 is a horizontal sectional view taken on the line 4—4 of Fig 3;

Fig. 5 is likewise a horizontal sectional view but taken on the line 5—5 of Fig. 3;

Figs. 8a, 8b and 8c are views, largely diagrammatic, illustrating the flow of gases in an intake manifold under certain conditions.

Figure 1:
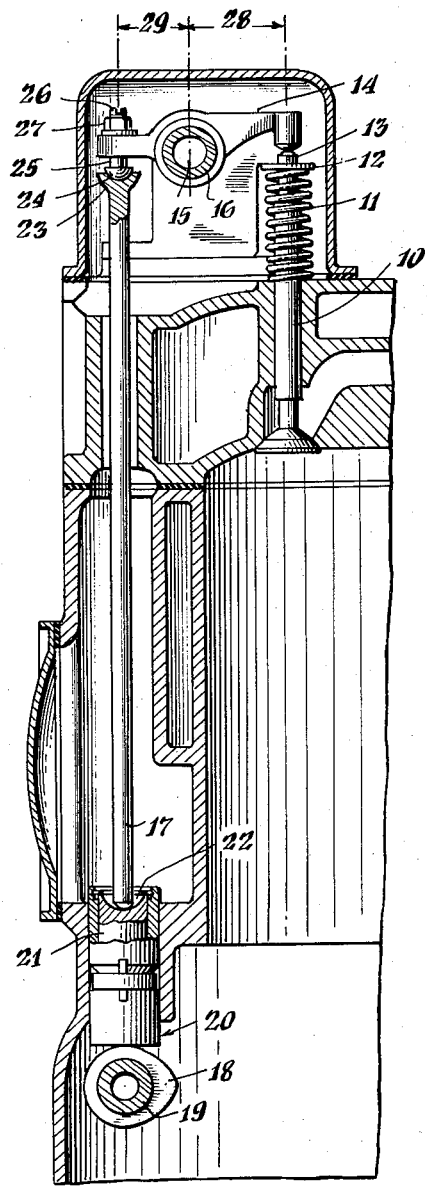
Fig. 1 is a fragmentary view of a combustion engine showing a typical arrangement of a poppet valve and operating mechanism therefor, and embodying an automatic mechanical length adjusting device.

Fig. 1 shows the general elements of an embodiment of the invention in a combustion gas engine of the type having overhead valves, the figure being somewhat fragmentary and comprising essentially a cross section through one cylinder and one of its valves and the operating mechanism therefor, which in this case employs a mechanical type of automatic length adjusting means. The poppet type valve 10 shown may comprise either the exhaust or intake valve. It is urged to its seat by a relatively strong spring 11 acting against the washer 12 held on the valve stem 13. The valve is intermittently operated from the overhead rocker arm 14 pivoted about a center 15 comprising the axis of the overhead shaft 16. The arm is operated from the push rod 17 which receives its axial movement from the cam 18 fixed on cam shaft 19. Intervening between the cam 18 and the push rod 17 is the automatic self-adjusting tappet device 20 which is shown in more detail in Figs. 3 to 5, but for the moment it is noted that the upper end has mounted therein a member 21 which has a concave upper end 22 in which is seated the lower rounded end of the push rod 17. The upper end of the push rod is provided with a concave upper end 23 in which is seated the semi-spherical ball part 24 formed on the lower end of the adjusting screw 25 which is threaded through the left part of the rocker arm 14. The upper end of the screw 25 is provided with a notch 26 adapted to receive a screwdriver for adjusting the screw 25 in the arm 24 and the screw has a lock nut 27. In accordance with conventional design the rocker arm 14 is shown as having a longer lever arm on the valve side than on the tappet side. The relation of the lever arm at the right, indicated by the dimension 28, with respect to the lever arm 29 on the tappet side, is about 1.7 to 1.

Figure 2:
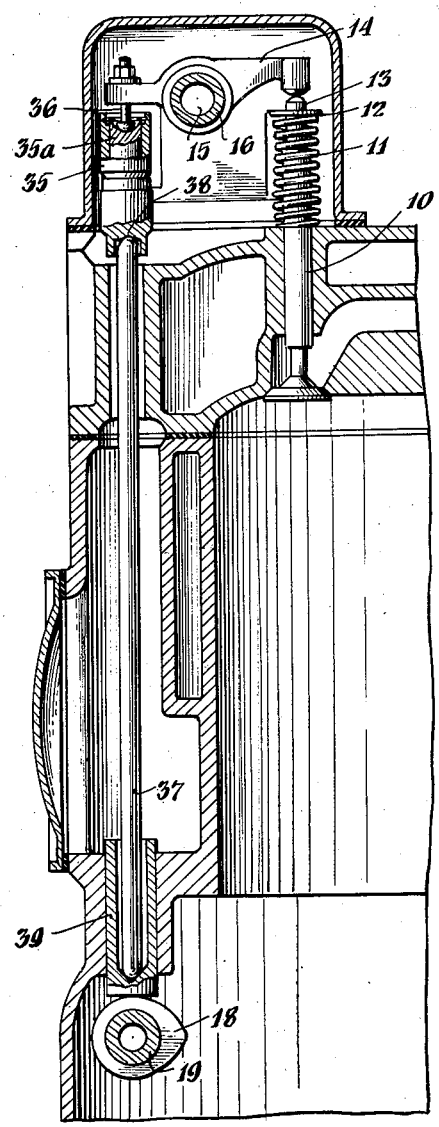
Fig. 2 is a similar type of view showing the length adjusting devices embodied at a different point in the linkage.

The linkage mechanism for a similar type of engine may be varied somewhat from that shown in Fig. 1. In Fig. 2 the automatic tappet device 35 is shown installed at the upper end of the push rod mechanism and the screw 36 corresponding to the screw 25 of Fig. 1 is shown seated in the member 35a vertically slidable within the tappet device 35. The upper end of the push rod 37 is seated at 38 in an opening in the bottom end of the shell of the tappet 35. The cam 18 operates against the bottom closed end of a hollow sleeve 39 in which is received the lower end of the push rod 37. The engine valve and overhead rocker arm are similar in general to that shown in Fig. 1.

It will be understood that the tappet device, to be described in detail shortly, may also be incorporated in other types of engines and valve operating linkages, for example in an L-type cylinder in which the valve is mounted at the side and directly over the cam in accordance with conventional designs. The particular automatic self-adjusting tappet device indicated at 20 is of the mechanical type but it should be understood that it could be of the hydraulic type with suitable hydraulic fluid supply means thereto of a character well known in engine constructions.

Referring to Figs. 3, 4 and 5, which show details of the tappet device 20 in Fig. 1, the particular embodiment comprises a hollow body or housing 50 in which is seated a sub-assembly of complemental screw means and related elements enclosed by the previously mentioned part 21 vertically slidable in the housing 50 at the upper open end thereof.

The sub-assembly mounted within the shell 50 providing the length compensating means includes a cooperating pair of threadably interfitted or engaged members 51 and 52. The member 51 is in the form of an internally threaded female sleeve or nut as shown having a bottom end beveled at 53 which is seated on a flat spring washer 54 which in turn is seated on the inclined bottom 55 of the shell 50. The member 52 is in the form of an externally threaded male member having a portion 56 threadably engaged in the nut 51 and having an upwardly extending cylindrical stem part 57. The stem 57 is provided with a circumferentially grooved flange portion 58 provided with a pair of diametrically opposed notches each presenting a radial abutment face 59.

The cooperating pair of threadably engaged members 51 and 52 are connected together by torsional spring means comprising as shown a helical spring 60 having one end 60a turned axially and seated in a hole in the nut flange 51a with a few turns adjacent thereto seated in the groove 51b for cinching of the spring. The opposite end of the spring 60 is turned radially inward at 60b to engage over one of the abutment faces 59 with a few turns adjacent thereto seated in the circumferential groove of the flange 58 as an aid in supporting the end of the spring. The torsion spring 60 operates to rotate the screw elements in a relative direction to cause extension of the sub-assembly to take up slack in the linkage, as is well understood in the art.

Means is provided to produce in reverse fore-shortening of the screw assembly in opposition to the torsional force of the spring. Such means may vary but in the present device comprises an inertia hammer in the form of a sleeve 65 capable of both rotary and axial motion on the male member stem 57. The inertia member 65 is provided with a helical slot 65a in which is engaged a pin 66 mounted to extend radially from the stem 57.

The male member 52 serves as a thrust transmitting member to the cap 21 which in turn engages against a push rod 17 the lower end of which is seated in the concave surface 22 of the cap member 21, as previously described. The cap member or sleeve 21 is held against rotary motion relative to the shell 50 as will be described shortly. To assure against "crashing" of the threads, that is prevention of the screw 56 being advanced into the nut 51 by the rapidly repeated axial thrust resulting from opening the engine valve, the stem 57 is provided with considerable area of contact with the cap member 21 to offer some frictional resistance to rotation of the stem 57 relative to member 21 when the parts are axially pressed together. As indicated in the present case the upper end of the stem 57 and the complemental depression in the member 21 are cone shaped and at the same angle or bevel as indicated at 57a.

The cap 21 is mounted for axial movement within the shell 50 but it is prevented from rotation therein by suitable means comprising in the present case a segmental key 70 having an arc-shaped edge adapted to seat in an opening 71 milled in the wall of the shell 50. When the key 70 is seated it has a portion extending inwardly into the shell and into a slot 72 extending longitudinally of the skirt portion 21a of the cap 21. The key 70 is held in position normally by a circular split spring member 73 adapted to be snapped into an annular groove 74 in the outer surface of the shell 50. The key 70 also has a notch 75 in the outer edge into which the spring snap ring 73 seats. The cap member 21 and its skirt 21a are thereby prevented from rotation relative to the shell 50 and any rotation of the tappet assembly 20 under the influence of the cam wiping across its bottom surface and thereby relative rotation between the assembly and the push rod 17 is prevented from affecting the independent rotation of the threaded members within the interior of the tappet casing. In other words the tappet assembly 20 may rotate as a unit but the two screw members may be rotated independently therein under the influence of the torsion spring 60 and, in the case of the male member under the effect of the inertia weight 65, without interference from relative rotation between the tappet means and the adjacent linkage members.

The automatic operation of the length compensating elements within the tappet assembly 20 is well understood in the art but may be briefly described. After the rotary cam 18 has lifted the tappet unit of Fig. 3 and the center of the cam lobe has passed the end face of the tappet, the latter will move down until it reaches the cam base circle as the cam continues to rotate. During such motion the inertia weight 65 is in an uppermost position with the pin 66 near the lower end or mouth of the helical slot 65a. The downward motion of the tappet device will abruptly cease but the inertia member 65 will continue to move downwardly until the end of the helical slot 65a engages against the pin 66 exerting a blow in a circumferential direction on the male thread member 52 in the foreshortening direction of the screw threaded members. Thereafter, the engine valve having seated and the parts being relieved of axial thrust, the torsion spring 60 tends to rotate the screw members in an opposite direction relative to each other to lengthen the linkage and remove any slack therein.

The flat spring washer 54, however, is of a strength to resist the effect of the torsion spring 60 and provides a certain amount of built-in lift loss to delay the opening of the engine valve and likewise to advance the closing thereof. In other words the washer has a strength less than that of the engine valve spring and collapses before the engine valve opens, for example, but on the other hand it has a sufficient strength to prevent collapse under the influence of the torsion spring 60. The lift loss provided by the washer 54 is particularly necessary when the tappets are designed as replacements, as is usually the case, for solid mechanical tappets in existing engines as originally designed. In such original designs of the solid tappets the linkage is normally adjusted to have a certain clearance in the range of about .006 to .028 inch when the engine is cool or only warm as in idling in order to provide space for expansion when the engine heats up and avoid cracking open the poppet valves. In idling, with the engine only warm, the valve normally is not cracked open until the engagement between the tappet part and the cam has advanced a certain distance up the ramp of the cam. The built-in lift loss in the present tappet insures that this condition is preserved and that the valve is not opened at the beginning of the cam ramp in idling operation and preserves the desired timing and in fact improves it under various conditions, as will be described more fully hereinafter.

An important feature of the present tappet device in association with other features and selection of proportions and adjustments is the provision of a stop means for limiting the amount of expansion or lengthening of the automatic self-adjusting device. The stop means may be varied considerably depending upon the specific design, including whether it is of the mechanical or hydraulic type. The stop means in the present mechanical type comprises a split wire spring 80 flattened across one diameter as shown particularly in Fig. 5 and adapted in assembly to be snapped into the annular groove 81 formed in the interior of the shell 50 at the upper open end. The wire spring member 80 therefore is positioned to be engaged by the cap portion 21 and limit its outward movement under the effect of the spring 60 operating in the screw assembly lengthening direction.

The tappet device 20 shown in Figs. 3, 4 and 5 corresponds to that embodied in the linkage assembly of Fig. 1, but it will be understood that with simple changes the tappet will be adapted for installation at other parts in the linkage and for other types of engines. For example the tappet device 35 shown in Fig. 2 may be like that shown in Fig. 3 with a modified lower end adapted to receive the push rod 37 as indicated in Fig. 2.

For an understanding of the present invention it will be helpful to describe some of the conditions and problems which exist in the operation of combustion engines and valve operation of the type concerned. For smooth idling operation in particular the top overlap of the open positions of the exhaust and inlet valves must be kept as small as possible. The reason is that there is a strong vacuum in the intake manifold and when both the valves are open at the same time (commonly referred to as top overlap) exhaust gases are drawn into the intake manifold and mix with the fresh explosive gases and continue on into other cylinders which are receiving a charge.

Figure 6:
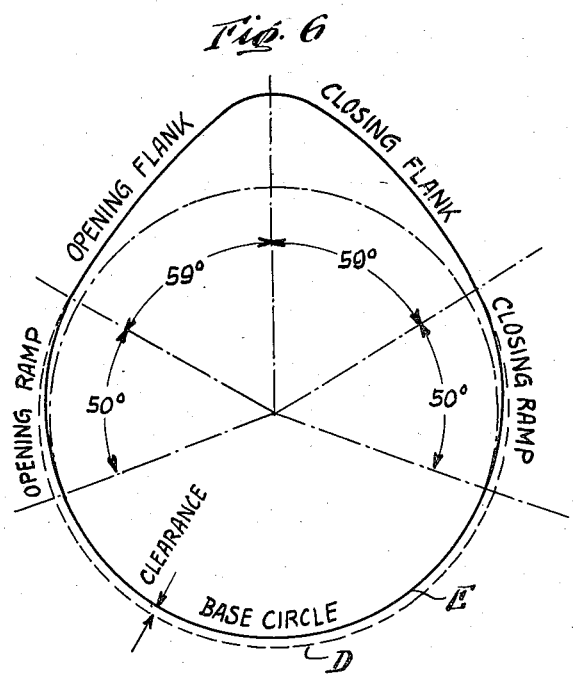
Fig. 6 is a somewhat diagrammatic view indicating the shape and zones of a typical valve operating cam.
Figure 7:
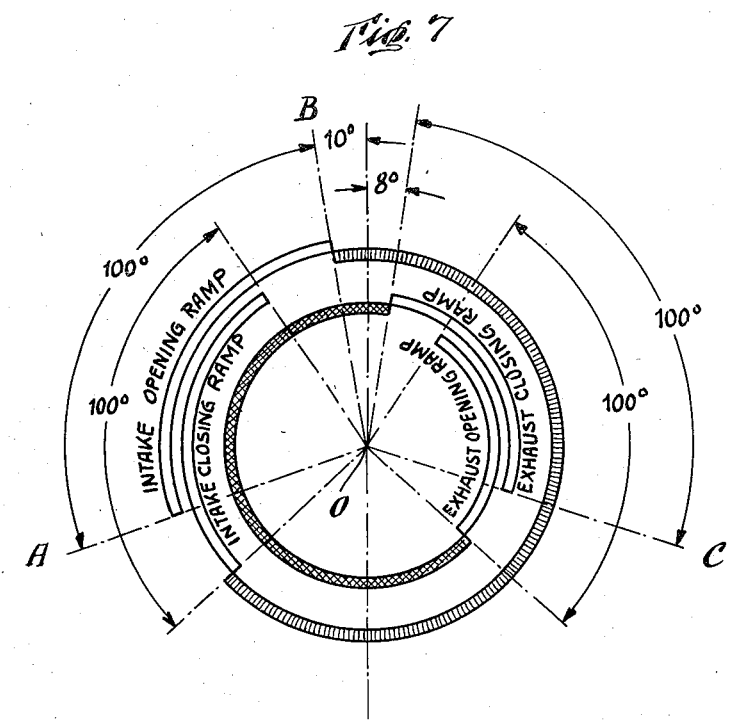
Fig. 7 is a diagram of the timing and events in the operation of the intake and exhaust valves with relation to the crankshaft angle of a single cylinder of a typical combustion engine.

Fig. 7 is a cycle diagram for one of the cylinders of a typical 6 cylinder 4-stroke cycle engine, with valves operated by a typical cam such as shown in Fig. 6. It should be borne in mind that the cams rotate at one-half the speed of the crankshaft and accordingly the corresponding angles or areas in Fig. 7 are double those in Fig. 6. For example the opening ramp of 50° in the cam of Fig. 6 corresponds to the crankshaft angle AOB of 100° of Fig. 7 for the intake valve ramp. If there is zero clearance or lash in both the exhaust and inlet operating linkage, in the particular example shown illustrated, the top overlap would be theoretically more than 200° of rotation of the crankshaft. This results from the fact that the intake valve would begin to open at about the crankshaft angle A before top dead center, and the exhaust valve on the same crankshaft revolution would not close completely until about the crankshaft angle C.

However, because the rate of lift or change in radius per degree of cam at the ramp area is quite small, and there is some elasticity in the valve linkage, and for various other reasons, the angle of top overlap with both the intake and exhaust valves open an appreciable amount would, as a practical matter, be less than 200° but nevertheless a very large angle of crank rotation. Nevertheless it would be too much and would produce rough engine idling operation. Furthermore when the engine began to heat up the linkage would expand and the amount of top overlap would increase, and under some conditions the valves would not fully seat. Accordingly it is normal practice in original engine design and adjustment to provide a substantial clearance in the linkage which as heretofore mentioned may be in the range of .006 to .028 inch. The clearance is indicated diagrammatically by the arc D shown in broken line in Fig. 7 from which it may be seen that it results in the respective valves opening later and closing sooner than is the case where there is zero clearance and the tappet engages the base circle E. The effect of heating is not generally the same on the exhaust and intake valves. Although for practical manufacturing reasons the cam ramps are usually made the same, the intake valve stem does not get as hot as the exhaust valve stem and expands less under engine load conditions. The clearance design and adjustment therefore are frequently different for the two.

The effect of the top overlap is illustrated in Figs. 8a to 8c which represent a typical six cylinder engine having a firing order 1, 5, 3, 6, 2, 4. In Fig. 8a the intake valve in No. 6 cylinder has just started to open. Exhaust gases from No. 6 cylinder are filling the manifold and flowing to No. 3 cylinder. In Fig. 8b the intake valve in No. 6 cylinder is wide open and the exhaust gases which had accumulated in the manifold are flowing back into No. 6 cylinder and also exhaust gases from No. 2 cylinder, the intake valve of which has just begun to open, are mixing with the gasoline-air mixture and flowing to No. 6. Fig. 8c shows that before No. 6 intake valve closes the intake in No. 4 cylinder will open and also feed exhaust gases into No. 6. Similar effects are produced on all cylinders by too much top overlap but it is especially bad on end cylinders.

Another bad effect, called wire drawing, is produced when the exhaust valve opens at the very beginning of the opening ramp, or closes at the end of the ramp, and particularly the former. The cam rise is very gradual at this area and the valve opens very slowly for about the next 50° of the crankshaft rotation and exhaust gases at high temperatures and high pressure are forced through the relatively small opening resulting in excessive wear on the valve and its seat.

The length compensating means and its relation to other parts and the manner of installation in accordance with the present invention alleviate the above conditions and effect other desirable results as will be discussed below. The device as described in connection with Fig. 3 has a suitable built-in lift loss provided by the washer 54 of several thousandths of an inch. The amount of the built-in lift loss will vary with the type of engine and the cam design. In the overhead valve type engine the top rocker arm commonly is designed so that the valve lever arm is longer than the tappet lever arm by an appreciable amount. The ratio varies in different designs and sometimes is less than 1.5. In the particular design or example selected for illustration and shown in Fig. 1 the ratio is 1.7. Accordingly the clearance at the valve stem will be 1.7 times the set clearance at the tappet. For best idling conditions with the temperature of the linkage parts relatively low it is preferable to adjust the linkage as by the screw 25 to provide a small amount of free idling clearance in the linkage in addition to the clearance provided by the lift loss washer 54. In a typical case a clearance is provided for idling conditions in the range of .010 to .015 inch or perhaps .020 inch on the tappet side of the rocker arm 14. It will be understood that in so adjusting the linkage and clearance the spring 60 will have rotated the screw parts 51 and 52 to the limit determined by the cap 21 engaging the stop wire 80.

In the average case for idling conditions the clearance at the valve stem including the lift loss is set for about .020 inch. The top overlap under such adjustment when idling may therefore be reduced to a relatively low angle. With the clearance described above, the top overlap is reduced to about 18° as a representative example. This results from a typical adjustment and relation in which the intake valve opens at about 10° before top dead center of the crankshaft and the exhaust valve closes at about 8° after top dead center. Then as the engine heats up under load and the free clearance is absorbed by expansion of the valve stems the top overlap increases but due to the lift loss provided by the washer 54 it still remains relatively low as compared particularly with a solid tappet and can be maintained in the range of 40° to 60° or about 45° in the example being described. The greater the clearance within reasonable limits the smoother the operation, but too much clearance produces noisy engine operation as a result of the valve striking its seat at high speed when seating occurs when the contact with the cam is on the flank of the cam rather than on the ramp. The reason for the noisy operation in the former case is that the rise or lift on the flank area of the cam is commonly several thousandths of an inch per degree whereas on the ramp it is less than a thousandth of an inch per degree. Over the flank area, therefore, the valve is closing at a much faster rate.

With an arrangement, relation of the parts and adjustment as described above the linkage will automatically adjust itself to desired efficient and damage free conditions under heavy load and so maintain itself. In effect as the linkage elements including particularly the valve stem heat up and expand the free idle clearance will be absorbed but normally the fixed lift loss clearance provided by the washer 54 will remain effective. In other words the valves open and close at angles of the crankshaft and camshaft where the contact with the cam is a substantial distance up the ramp and although the top overlap is greater than when idling it is nevertheless kept small and sufficiently low for good operation and wire drawing is kept at a minimum. The angle of the top overlap will vary, of course, with the amount of lift loss embodied in washer 54 and the shape of the cam. On the other hand with a normal solid tappet and no lift loss means the entire clearance could be absorbed by the expansion under heavy load with a resultant large top overlap.

By way of example where a factory has designed the original engine with solid non-adjustable tappets with a recommended clearance of .020 inch, in a replacement of the solid tappet by the present arrangement a lift loss in the range of about .013 to .015 inch is provided. As will be pointed out in more detail, employing an arrangement and adjustment in accordance with the present disclosure, the top overlap is maintained below about 50° of the crankshaft angle for even heavy load conditions with the engine running hot. When solid tappets without lift loss are employed the clearance under high operating temperatures reduces to a low amount which may be even near to zero with a corresponding large top overlap. The amount will vary of course with specific conditions including the original engine design. In some engines the cams for the exhaust and intake have different ramps and in other engines they have the same ramp. Where they have the same ramp the effect under load conditions will be some different at the exhaust valve from that at the intake valve since the exhaust valve stem is subjected to the hot exhaust gases whereas the intake valve stem is subjected to cooler incoming gases. In a typical case of solid tappets with a cam for example like that shown in Fig. 6 for both the exhaust and intake valve and with a normal clearance setting of about .020 inch the top overlap amounts to more than 100° of crank angle when the engine is operating under heavy load.

Of further special importance in the present invention is the functioning of the means for limiting the extension of the screw threaded members 51 and 52 by the stop means built into the length adjusting tappet means to avoid the effect of a valve sticking. It has been discovered that defective engine operation has resulted in the past in connection with automatically adjusting tappets in that the engine valve would stick in an open position on occasion and the tappet think, so to speak, that there was too much clearance and would progressively increase in length and continue positively to hold the valve open. Even if the valve eventually worked itself loose and the tappet gradually shortened to the proper working condition the same thing could again happen. In the case of the present tappet it is so designed and proportioned, including the relation of the stop means, in the form of the wire ring 80 in the specific embodiment shown, that when in released and fully expanded position the tappet will provide a good working condition and will be prevented from expanding beyond a predetermined position or length.

In general the relation is such that with the engine relatively cool as under idling conditions, and with the cam base circle area at the tappet, the cap 21 will be engaged against the stop ring 80 and the desired free clearance for idling is established by adjustment of screw 25. This adjustment commonly would be such as to leave a free clearance of about .004 to .006 inch. That clearance is of course in addition to the built-in lift loss clearance provided by washer 54. The result is a relatively small angle of top overlap which may be for example 20° or even less of crank angle. Then as the engine heats up and the linkage including particularly the valve stem expands the tappet will shorten as conditions require, or it may expand, but it normally provides the clearance of the lift loss washer and the top overlap under hot heavy engine load conditions remains low in the range around 50° of crank angle or less. If the valve sticks the automatic length adjusting means cannot expand beyond a certain amount and can be so designed and the stop means so adjusted that the engine valve is not prevented from seating or substantially so.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description and shown in the accompanying drawing shall be interpreted as illustrative and not in a limiting sense.

I claim:

1. In an engine having a poppet type valve with a valve stem, an operating cam, and operating linkage connecting said cam and said valve stem for effecting a cycle of opening and closing of the valve, said linkage including therein an automatic length compensating device operative automatically in the operation of the engine to expand and take up the slack in the linkage when the valve is in its normally seated position, and stop means embodied in said device operative to limit the automatic expansion of said device, said stop means and the related parts being constructed, adjusted and arranged such that the overall length of the linkage is prevented from being extended by the automatic operation to an extent such as to prevent complete seating of the valve in accordance with the normal desired cycle.

2. In an engine having a poppet type valve with a valve stem, an operating cam, and operating linkage connecting said cam and said valve stem for effecting a cycle of opening and closing of the valve, said linkage including therein a manually adjustable clearance regulator and an automatic length compensating device operative automatically in the operation of the engine to expand and take up the slack in the linkage when the valve is in its normally seated position, and stop means embodied in said device operative to limit the automatic expansion of said device, said regulator being initially adjusted under relatively cool conditions of the linkage and with the said device extended to the limit permitted by said stop means to provide a few thousandths of an inch clearance for normal idling operation of the engine.

3. In an engine having a poppet type valve with a valve stem, an operating cam, and operating linkage connecting said cam and said valve stem for effecting a cycle of opening and closing of the valve, said linkage including therein a manually adjustable clearance regulator and an automatic length compensating device operative automatically in the operation of the engine to expand and take up the slack in the linkage when the valve is in its normally seated position, a spring lift loss means in said linkage providing a collapsible lift loss clearance of a few thousandths of an inch, and stop means embodied in said device operative to limit the automatic expansion of said device, said regulator being initially adjusted under relatively cool conditions of the linkage and with the said device extended to the limit permitted by said stop means to provide a few thousandths of an inch clearance for normal idling operation of the engine in addition to the said lift loss clearance.

4. In an engine having poppet type intake and exhaust valves each with a valve stem, an operating cam, and operating linkage connecting said cam and said valve stem for effecting a cycle of opening and closing of the valve, said linkage including therein a manually adjustable clearance regulator and an automatic mechanical length compensating device and a predetermined lift loss clearance, the method of adjusting and controlling the operation which comprises applying a stop to limit the extent of automatic lengthening of said device, adjusting said regulator when the linkage is relatively cool and with the length compensating device expanded to the full extent permitted by the stop means to provide a few thousandths of an inch clearance in addition to said predetermined lift loss clearance to delay correspondingly in the cycle the valve opening point and advance the valve closing point and reduce the top overlap of the intake and exhaust valves under idling conditions, said linkage being adapted to expand when heated under heavier load conditions and take up said additional clearance provided by said regulator.

5. In an engine having a poppet type valve with a valve stem, an operating cam, and operating linkage connecting said cam and said valve stem for effecting a cycle of opening and closing of the valve, said linkage including therein an automatic mechanical length compensating device comprising a pair of members cooperatively threaded together and serving as thrust transmitting elements in the axial direction, said members being also connected together by torsional spring means urging relative rotation between said members in the lengthening direction, inertia means operated by reciprocatory movement of said device to produce relative rotation between said members in the shortening direction, and stop means embodied in said device for limiting the relative movement in the lengthening direction under the effect of said spring, said stop means and the related parts being constructed, adjusted and arranged such that the overall length of the linkage is prevented from being extended beyond a predetermined amount by the action of said spring sufficiently to prevent appropriate operation of the valve and a normal cycle.

6. In an engine having a poppet type valve with a valve stem, an operating cam, and operating linkage connecting said cam and said valve stem for effecting a cycle of opening and closing of the valve, said linkage including therein an automatic mechanical length compensating device comprising an open-ended thrust receiving housing, a sub-assembly seated in said housing having a pair of members cooperatively threaded together with a first one of said members serving as a thrust transmitting element at the open end of said housing, said members being also connected together by torsional spring means urging relative rotation between said members in the lengthening direction, inertia means operated by reciprocatory movement of said device to produce relative rotation between said members in the shortening direction, and stop means embodied in said device for limiting the outward movement of said first one of said members under the effect of said spring, said stop means and the related parts being constructed, adjusted and arranged such that the overall length of the linkage is prevented from being extended by the action of said spring sufficiently to prevent complete seating of the valve in accordance with the normal desired cycle.

7. In an engine having a poppet type valve with a valve stem, an operating cam, and operating linkage connecting said cam and said valve stem for effecting a cycle of opening and closing of the valve, said linkage including therein a manually adjustable clearance regulator and an automatic mechanical length compensating device said device comprising a pair of members cooperatively threaded together and serving as thrust transmitting elements in the axial direction, said members being also connected together by torsional spring means urging relative rotation between said members in the lengthening direction, inertia means operated by reciprocatory movement of said device to produce relative rotation between said members in the shortening direction, said device having embodied therein stop means arranged to limit the relative movement in the lengthening direction under the effect of said spring and a built-in predetermined lift loss clearance of a few thousandths of an inch, the said regulator being initially adjusted under relative cool conditions of the linkage and with the said device extended to the limit permitted by said stop means to provide a few thousandths of an inch clearance in addition to the said predetermined lift loss clearance.

8. In an engine having poppet type intake and exhaust valves each with a valve stem, an operating cam, and operating linkage connecting said cam and said valve stem for effecting a cycle of opening and closing of the valve, said linkage including therein a manually adjustable clearance regulator and an automatic mechanical length compensating device with a built-in predetermined lift loss clearance, the method of adjusting and controlling the operation which comprises applying a stop to limit the extent of automatic lengthening of said device, adjusting said regulator when the linkage is relatively cool and with the length compensating device expanded to the full extent permitted by the stop means to provide a few thousandths of an inch clearance in addition to said predetermined lift loss clearance to delay correspondingly in the cycle the valve opening point and advance the valve closing point and reduce the top overlap of the intake and exhaust valves under idling conditions, said linkage being adapted to expand when heated under heavier load conditions and take up said additional clearance provided by said regulator.

9. In an engine having a poppet type valve with a valve stem and spring means to urge the valve to closed position, an operating cam, and operating linkage connecting said cam and said valve stem for effecting a cycle of opening and closing of the valve, said linkage including therein a manually adjustable clearance regulator, a spring lift loss means in said linkage providing a resilient lift loss clearance of a few thousandths of an inch collapsible under the force of said valve spring, and a length compensating device operative automatically in the operation of the engine to expand and take up the slack in the linkage when the valve is in its normally seated position but ineffective to collapse said spring lift loss means, and stop means embodied in said device operative to limit the automatic expansion of said device, said stop means and manually adjustable regulator being arranged and adjusted such that the overall length of the linkage is prevented from being extended by the automatic device to an extent such as to prevent complete seating of the valve and appropriate operation thereof.

References Cited in the file of this patent

UNITED STATES PATENTS

| | | |
|---|---|---|
| 2,630,792 | Engemann | Mar. 10, 1953 |
| 2,689,553 | Schmidt | Sept. 21, 1954 |
| 2,751,896 | Moser | June 26, 1956 |